(12) United States Patent
Wang et al.

(10) Patent No.: US 11,353,978 B2
(45) Date of Patent: Jun. 7, 2022

(54) METHOD AND APPARATUS FOR DETERMINING A TOUCH POINT

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Meng Wang, Beijing (CN); Zhixiang Fang, Beijing (CN); Xuxu Hu, Beijing (CN)

(73) Assignees: HEFEI BOE OPTOELECTRONICS TECHNOLOGY CO, LTD., Anhui (CN); BOE TECHNOLOGY GROUP CO., LTD., Bejing (CN)

(*) Notice: Subject to any disclaimer, the term of this patent is extended or adjusted under 35 U.S.C. 154(b) by 0 days.

(21) Appl. No.: 17/279,510

(22) PCT Filed: Aug. 5, 2020

(86) PCT No.: PCT/CN2020/106932
§ 371 (c)(1),
(2) Date: Mar. 24, 2021

(87) PCT Pub. No.: WO2021/036718
PCT Pub. Date: Mar. 4, 2021

(65) Prior Publication Data
US 2021/0397285 A1    Dec. 23, 2021

(30) Foreign Application Priority Data
Aug. 29, 2019    (CN) .......................... 201910808262.3

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/04182* (2019.05)

(58) Field of Classification Search
CPC ....... G06F 3/041661; G06F 3/041–047; G06F 2203/041–04114
See application file for complete search history.

(56) References Cited

U.S. PATENT DOCUMENTS

2010/0214236 A1    8/2010   Kim
2010/0231553 A1*   9/2010   Yabuuchi .......... H04N 1/00411
                                                 345/174
(Continued)

FOREIGN PATENT DOCUMENTS

CN    101727229 A    6/2010
CN    101847069 A    9/2010
(Continued)

OTHER PUBLICATIONS

Chinese Office Action corresponding to CN 201910808262.3; dated Feb. 19, 2021 (14 pages, including English translation).
(Continued)

*Primary Examiner* — Sanjiv D. Patel
(74) *Attorney, Agent, or Firm* — Myers Bigel P.A.

(57) ABSTRACT

The present application provides a method of determining a touch point, including detecting a touch signal value of each point, determining a first point whose touch signal value is greater than a report point threshold as a center point, extracting touch signal values of a plurality of second points around the center point, comparing the extracted touch signal values of the plurality of second points with an auxiliary threshold, counting the number of the second points whose touch signal values are greater than the auxiliary threshold, and determining the first point as a touch point when the number of the second points whose touch
(Continued)

signal values are greater than the auxiliary threshold is greater than or equal to a first preset value.

15 Claims, 7 Drawing Sheets

(56) References Cited

U.S. PATENT DOCUMENTS

2015/0248178 A1* 9/2015 Oh ..................... G06F 3/04166
                                                        345/174
2016/0034103 A1    2/2016 Yoshikawa et al.

FOREIGN PATENT DOCUMENTS

| CN | 103970357 A | 8/2014 |
| CN | 105320385 A | 2/2016 |
| CN | 106951132 A | 7/2017 |
| CN | 109240531 A | 1/2019 |
| CN | 111338495 A | 6/2020 |

OTHER PUBLICATIONS

Chinese Office Action corresponding to CN 201910808262.3; dated Jun. 30, 2021 (13 pages, including English translation).
International Search Report corresponding to PCT/CN2020/106932; dated Nov. 10, 2020 (13 pages, including English translation).

* cited by examiner

METHOD AND APPARATUS FOR DETERMINING A TOUCH POINT

CROSS-REFERENCE TO RELATED APPLICATIONS

The present application is the U.S. national phase entry of PCT/CN2020/106932, with an international filing date of Aug. 5, 2020, which claims the benefit of Chinese Patent Application No. 201910808262.3, filed on Aug. 29, 2019, the entire disclosures of which are incorporated herein by reference.

TECHNICAL FIELD

The present invention relates to the field of touch technology, particularly to a method and an apparatus for determining a touch point.

BACKGROUND

With the development of the touch technology, more and more mobile terminals adopt the touch manner to perform man-machine interaction, including mobile phones, tablets, computers etc. The touch technology can be classified into resistance type, capacitance type, acoustic wave type, optical type and the like according to the principle of induction. At present, capacitive touch is widely used. In the capacitive touch, the touch structure includes staggered electrodes, and fixed coupling capacitance exists between the electrodes. When being touched by fingers, the fixed coupling capacitance varies, so the position of the touch point can be determined by detecting such variation.

The development of the touch technology makes the man-machine interaction more direct, however, with the complexity of application scenarios and the influence of the process of device itself, the touch products often have noise interference (such as variations of temperature, magnetic field etc.), as a result, some untouched points are determined as touch points, i.e., ghost points.

SUMMARY

According to a first aspect of the present application, a method of determining a touch point is provided, comprising: detecting a touch signal value of each point; determining a first point whose touch signal value is greater than a report point threshold as a center point; extracting touch signal values of a plurality of second points around the center point; comparing the extracted touch signal values of the plurality of second points with an auxiliary threshold, and counting the number of the second points whose touch signal values are greater than the auxiliary threshold; determining the first point as a touch point when the number of the second points whose touch signal values are greater than the auxiliary threshold is greater than or equal to a first preset value.

In some embodiments, before comparing the extracted touch signal values of the plurality of second points with an auxiliary threshold, the method further comprises: comparing the extracted touch signal values of the plurality of second points with an abnormal threshold, and counting the number of the second points whose touch signal values are greater than the abnormal threshold; determining the first point as a non-touch point when the number of the second points whose touch signal values are greater than the abnormal threshold is greater than or equal to a second preset value.

In some embodiments, the report point threshold is greater than an auxiliary threshold. Optionally, the report point threshold is twice as large as the auxiliary threshold.

In some embodiments, the first preset value is greater than or equal to the second preset value. Optionally, the first preset value is 4.

In some embodiments, the abnormal threshold is equal to the report point threshold.

In some embodiments, the method further comprises: determining the first point is a non-touch point when the number of the second points whose touch signal values are greater than the auxiliary threshold is less than the first preset value.

According to a second aspect of the present application, an apparatus of determining a touch point is provided, comprising: a detection module configured to detect a touch signal value of each point; a determination module configured to determine a first point whose touch signal value is greater than a report point threshold as a center point; an extraction module configured to extract touch signal values of a plurality of second points around the center point; a first judgment module configured to compare the touch signal values of the plurality of second points with an auxiliary threshold, and to count the number of the second points whose touch signal values are greater than the auxiliary threshold; a decision module configured to determine the first point as a touch point in response to the number of the second points whose touch signal values are greater than the auxiliary threshold being greater than or equal to a first preset value.

In some embodiments, the apparatus further comprises a second judgment module configured to compare the touch signal values of the plurality of second points with an abnormal threshold, and to count the number of the second points whose touch signal values are greater than the abnormal threshold, and wherein the decision module is further configured to determine the first point as a non-touch point in response to the number of the second points whose touch signal values are greater than the abnormal threshold being greater than or equal to a second preset value.

In some embodiments, the report point threshold is greater than the auxiliary threshold.

In some embodiments, the first preset value is greater than or equal to the second preset value.

In some embodiments, the abnormal threshold is equal to the report point threshold.

In some embodiments, the decision module is further configured to determine the first point is a non-touch point in response to the number of the second points whose touch signal values are greater than the auxiliary threshold being less than the first preset value.

According to a third aspect of the present application, a touch display device is provided, comprising: a touch display panel; and an apparatus of determining a touch point according to the embodiments of the present application as described above and in other parts of the description, the apparatus of determining a touch point being connected with the touch display panel, and being configured to determine whether a touch point exists on the touch display panel and a position of the touch point.

According to a fourth aspect of the present application, a computer readable storage medium is provided, on which computer instructions are stored, wherein the method of determining a touch point according to the embodiments of the present application as described above and in other parts of the description is carried out when the computer instructions are executed by a processor.

BRIEF DESCRIPTION OF THE DRAWINGS

Hereby the embodiments of the present application will be described more specifically by way of non-restrictive examples with reference to the accompanying drawings. The drawings are merely schematic and the same reference sign therein indicates the same part all along. In the drawings.

DETAILED DESCRIPTION

Various example embodiments of the present application will be described hereby more completely with reference to the accompanying drawings. However, it shall be appreciated that the specific structures and functional details disclosed herein are merely representative. The example embodiments can be implemented in many alternative ways, and should not be explained as only being limited to the specific example embodiments illustrated herein. In addition, in the context, for simple and clear, detailed description on familiar structures and methods are omitted so as to avoid redundant details and possible confusion.

Figure 1:
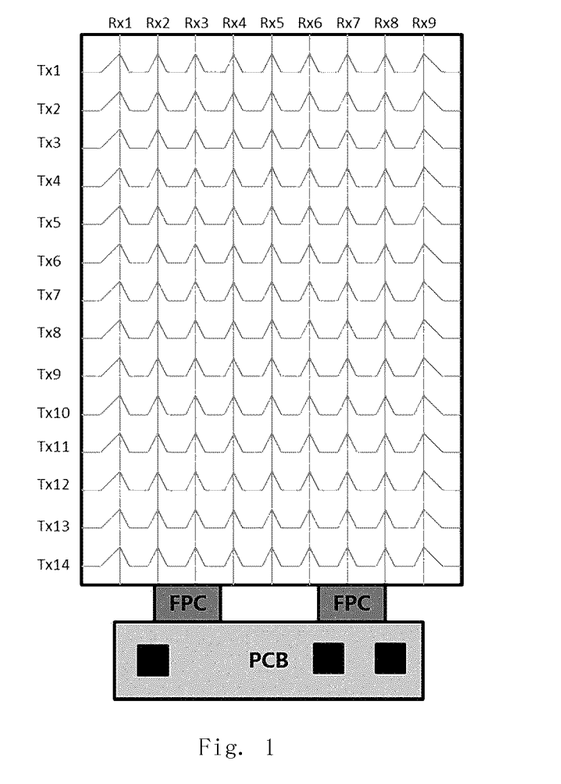
FIG. 1 schematically shows a touch structure of the prior art.
Figure 2:
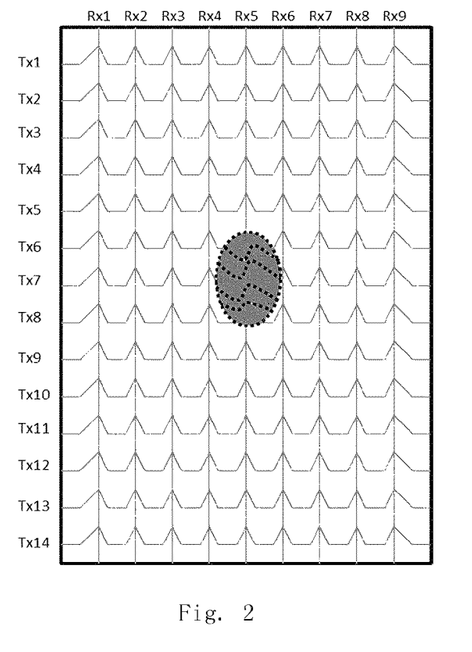
FIG. 2 schematically shows variation of the touch structure in FIG. 1 when being touched by a finger.
Figure 3:
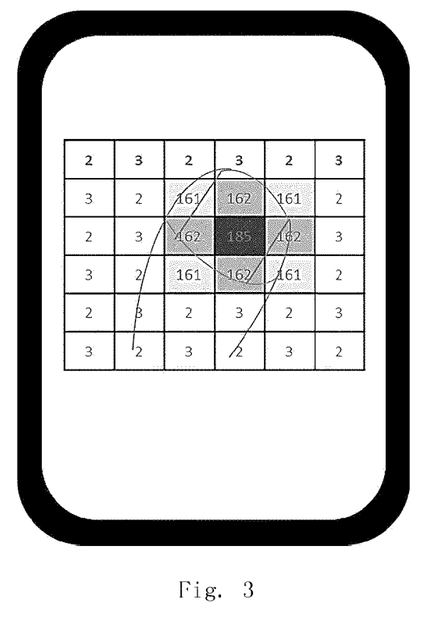
FIG. 3 schematically shows touch signal values of the touch structure in FIG. 1 when being touched by a finger.

FIG. 1 schematically shows a general architecture of the touch product, comprising a screen body, a signal transmitting terminal Tx, a signal receiving terminal Rx and a touch controller (shown herein as a printed circuit board (PCB) and a flexible circuit board (FPC)). In a conventional method of determining a touch point, the touch controller determines whether a touch action occurs by detecting the capacitance variation between Tx/Rx. When there is no touch, fixed capacitance exists between Tx/Rx. Whereas if touch occurs, as shown in FIG. 2, the local capacitance at the touch point varies. Generally, the sensing pitch is about 5 mm, a plurality of sensing blocks can be covered when being touched by a finger. Exemplarily, the variation occurred is as shown in FIG. 3, the capacitance variation value in the touch area is significantly higher than the untouched area. Moreover, the touch area includes a plurality of points, and the capacitance variation value of the center point is maximum, the capacitance variation values of the points around the center point is less than the capacitance variation value of the center point. The touch controller can detect the capacitance variation value of the touch area. When the capacitance variation value exceeds a set threshold, the point whose capacitance variation value is maximum in this area is determined as the touch point.

Figure 4:
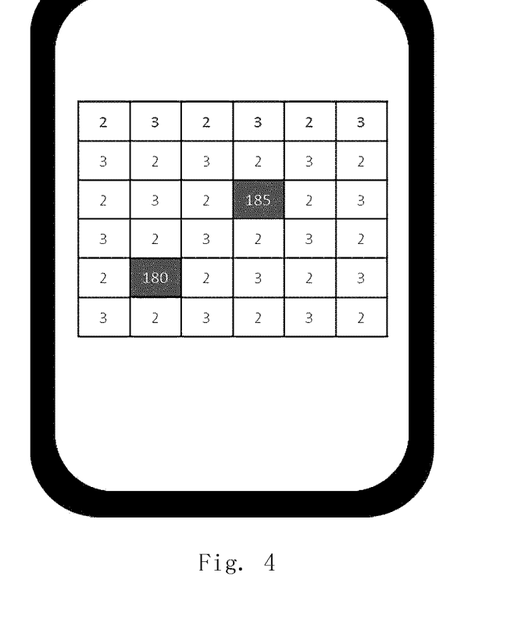
FIG. 4 schematically shows touch signal values of the touch structure in FIG. 1 in case of noise interference.

However, as described above, in some application scenarios, in case of being untouched, some points on the screen may have capacitance variation due to noise interference (such as variation of temperature, magnetic field etc.). FIG. 4 exemplarily shows such variation due to interference. As shown in FIG. 4, there are two single points with larger capacitance variation values. In the detecting process according to said method, when the capacitance variation values of these untouched points exceed a threshold, these points will be determined as touch points, thereby generating ghost points, which however is apparently not expected. The traditional method eliminates the ghost points by enhancing control to the noise threshold in the touch firmware, however, limited by the screen differences and the complexity of the use environment, it is difficult to select the noise threshold reasonably, thus, the ghost point problem cannot be solved completely.

Figure 5:
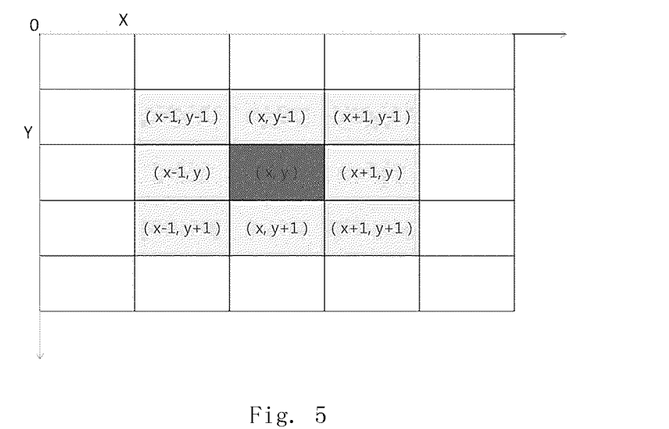
FIG. 5 schematically shows a touch point judging mechanism according to an embodiment of the present application.

The present application proposes a method of avoiding the ghost point problem by improving the touch point determining rules. The method proposed increases judging rules on the basis of the conventional touch point determination mechanism described above. As shown in FIG. 5, when the touch controller detects that the touch signal value of a certain point position (x, y) is greater than a threshold T (i.e, the report point threshold), this point position (x, y) is determined as a center point, and the point (x, y) is taken as the center to count the touch signal values of its adjacent 8 point positions $(x-1, y-1)$, $(x, y-1)$, $(x+1, y-1)$, $(x-1, y)$, $(x+1, y)$, $(x-1, y+1)$, $(x, y+1)$, $(x+1, y+1)$. For the touch points generated by finger touch, when the touch signal value of the center point is greater than the threshold T, the touch signal values of the surrounding eight points will be less than T and greater than T*50% generally (as described above with respect to FIG. 3). Whereas for ghost points caused by noise, the touch signal values of the 8 points around the center point are generally all less than T*50% (as described above with respect to FIG. 4). Therefore, the touch signal values of the eight points around the center point are compared with T*50% (i.e., an auxiliary threshold, the lower limit threshold of the touch signal values of the point around the center point), and the number of the points whose touch signal values are greater than T*50% is counted. In an embodiment of the present application, when there are four or more points among the eight points whose touch signal values are greater than T*50%, the center point will be determined as a touch point. Otherwise, it will be determined as a non-touch point, i.e., a ghost point. Exemplarily, in the above embodiment, the touch signal value can be directly compared with the auxiliary threshold T*50%, or a ratio of the touch signal value to the report point threshold T can be calculated and this ratio is compared with 50%, or other available methods can be used. In the context of the present application, the specific comparing method is not limited.

However, in extreme cases, the noise may also cause that there is a plurality of points among the surrounding eight points except for the center point whose touch signal values are greater than an abnormal threshold (i.e., the upper limit threshold of the touch signal values of the points around the touch point). With respect to such a case, the touch signal values of the eight points around the center point can be compared with the abnormal threshold (for example, the abnormal threshold can be set as T), and the number of the points whose touch signal values are greater than the abnormal threshold can be counted. In an embodiment of the present application, when there are four or more points among the eight points whose touch signal values are greater than the abnormal threshold, the center point will be determined as a non-touch point, i.e., a ghost point. Optionally, the points among the eight points around the center point whose touch signal values are greater than T can also be determined as ghost points.

Thus, the present application can, on the basis of no increase in cost and process, use algorithm optimization to avoid the ghost point problem caused by noise interference, which reduces the risk of adverse events and is easy to realize.

It shall be noted that although many specific values are mentioned in the embodiments described above, they are only illustrative for description, and are not meant to limit the present application to these specific values. For example, when the center point is located at the edge of the screen, the touch signal values of five points around it can be counted. When the center point is located at the corner of the screen, the touch signal values of three points around it can be counted. In addition, in some embodiments, the touch signal values of some of the plurality of points around the center point can be counted selectively, e.g., only counting the four points adjacent to the center point, such as (x, y−1), (x−1, y), (x+1, y) and (x, y+1) shown in FIG. 5. In some other embodiments, the touch signal values of more points in the vicinity of the center point can be counted, such as more points around the eight points shown in FIG. 5. With respect to the latter case, additional auxiliary threshold and abnormal threshold can be set for more points around the eight points and the similar determining steps as described above can be carried out. For the sake of brevity, it will not be elaborated here.

Furthermore, the auxiliary threshold (i.e., T*50% in the above) for comparing with the touch signal values of the surrounding points so as to determine whether the center point is a touch point can be any appropriate value that is greater than 0 and less than the report point threshold T. The abnormal threshold for comparing with the touch signal values of the surrounding points so as to determine whether the center point is a ghost point can be slightly less than or slightly greater than the report point threshold T while substantially not influencing the determination result. Moreover, the values "four or more" described above for determining whether it is the touch point and for determining whether it is the ghost point can be other appropriate values such as three or more, two or more, five or more, six or more and the like depending on specific conditions. Moreover, the value for determining whether it is a touch point and the value for determining whether it is a ghost point can be different, for example, the former is "four or more", while the latter is "three or more". However, in case of without other determining steps, in order to avoid misjudging, the latter should not be greater than the former. Otherwise, exemplarily, if the former is "four or more" while the latter is "five or more", the center will be misjudged as a touch point in the event that there are exactly four ghost points in the eight points around the center point.

Figure 6:
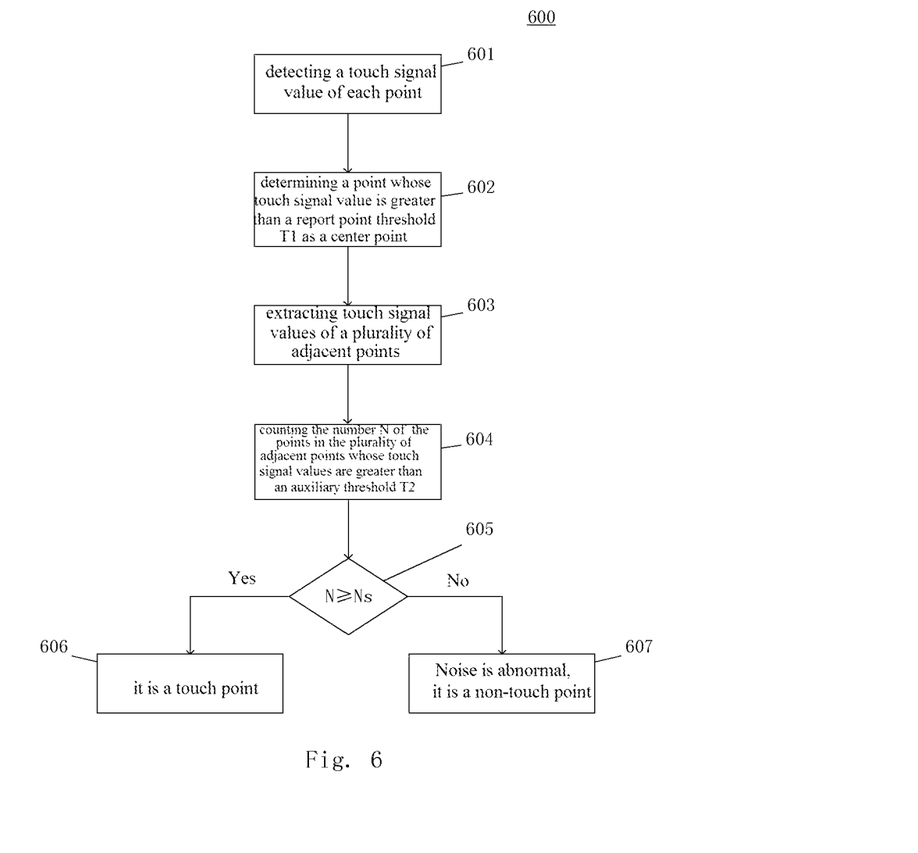
FIG. 6 is a flow chart of an example of a method of determining a touch point according to an embodiment of the present application.

FIG. 6 shows a flow chart of a touch point determination method according to an embodiment of the present application. At step 601, a touch signal value of each point is detected. Depending on specific applications, the touch signal value can be an electrical signal such as a capacitance value, a voltage value, a current value or variation of the electrical signal, or can also be an optical signal, a magnetic signal, or an acoustic signal and so on or variation thereof. The touch signal value can be detected in various appropriate ways correspondingly, e.g., by a corresponding electrical detection device or a corresponding sensor. At step 602, the point whose touch signal value is greater than the report point threshold T1 is determined as the center point. At step 603, the touch signal values of a plurality of points around the center point are extracted. At step 604, the number N of the points in the plurality of points whose touch signal values are greater than the auxiliary threshold T2 is counted. At step 605, the N obtained is compared with a first preset value Ns, if N≥Ns, the center point will be determined as a touch point (step 606), conversely, the center point will be determined as a non-touch point (step 607).

Figure 7:
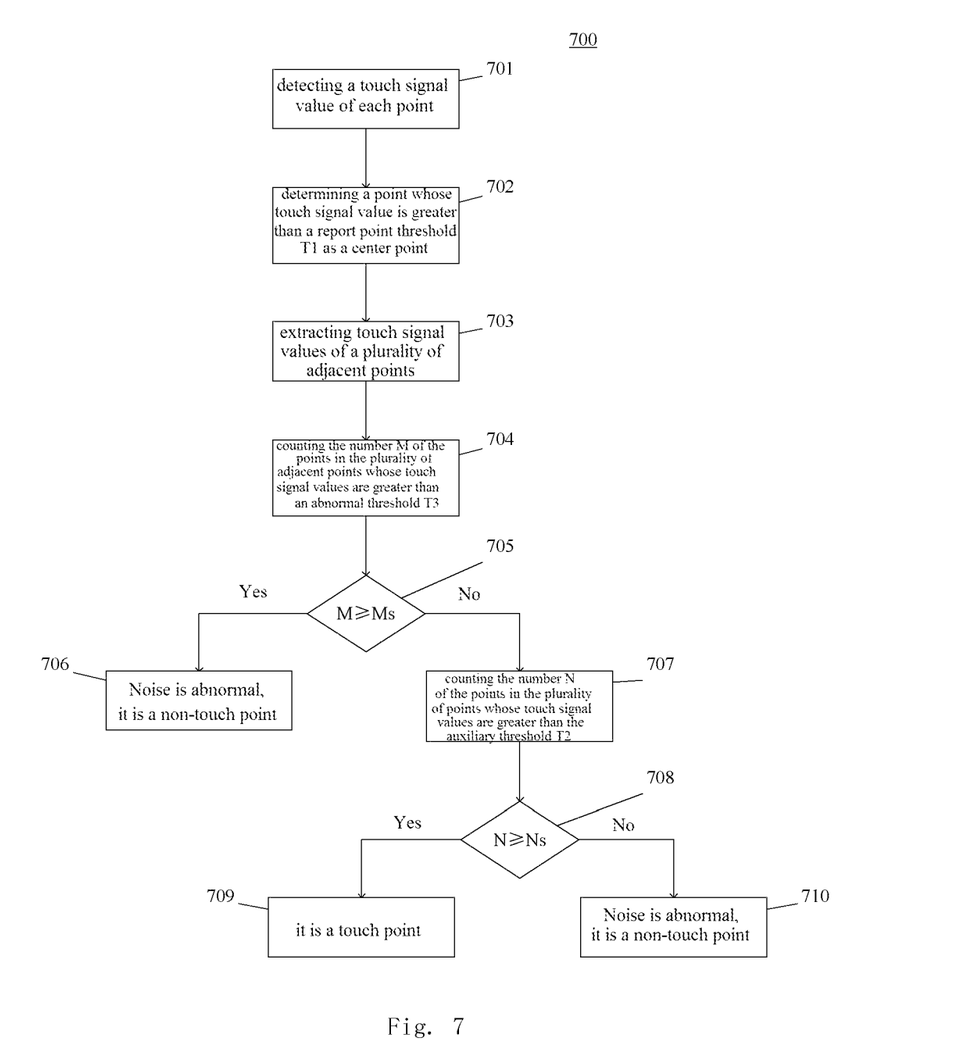
FIG. 7 is a flow chart of another example of a method of determining a touch point according to an embodiment of the present application.

FIG. 7 shows a flow chart of the touch point determination method according to another embodiment of the present application. Step 701 to step 703 are same as steps 601-603 shown in FIG. 6, so they are omitted for brevity. At step 704, the Number M of points in the plurality of points around the center point whose touch signal values are greater than an abnormal threshold T3 is counted. At step 705, the M obtained is compared with a second preset value Ms, if M≥Ms, the center points will be determined as a non-touch point (step 706), conversely, the method proceeds to step 707. At step 707, the number N of points in the plurality of points around the center point whose touch signal values are greater than the auxiliary threshold T2 is counted. At step 708, the N obtained is compared with the first preset value Ns, if N≥Ns, the center point will be determined as a touch point (step 709), conversely, the center point will be determined as a non-touch point (step 710).

It shall be noted that the methods described above with respect to FIGS. 6 and 7 can be carried out by a computing device, and can be achieved using software, firmware, hardware or combinations thereof. The methods therein are shown as a group of steps, the steps can be performed in an order different from that as shown. For example, the steps 704 to 705 and the steps 707-708 can be performed in parallel or conversely, as long as the following judgment conditions are true: if M<Ms and N≥Ns are both true, the center point is determined as a touch point, and the center point is determined as a non-touch point in other cases.

It shall be further noted that the various thresholds and preset values described above can be preset, such as being preset by the manufacturer that manufactures or sells the relevant device, being set by commissioning staff during device commissioning or being set by the user during use. In addition, these values can also be automatically adjusted by the device based on specific application scenarios or environment conditions, so as to realize more accurate judgment.

Figure 8:
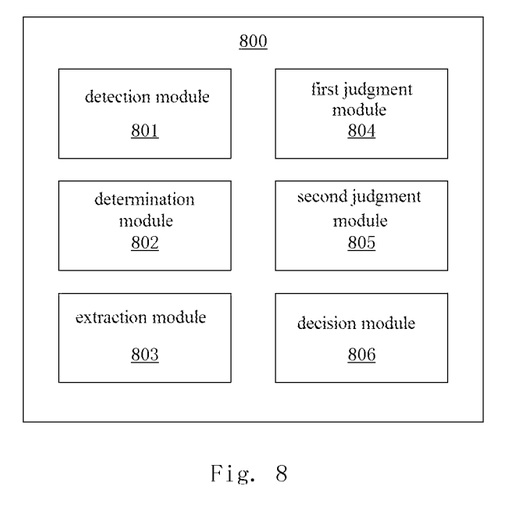
FIG. 8 is a schematic block diagram of an apparatus of determining a touch point according to an embodiment of the present application.

FIG. 8 shows a schematic block diagram of an apparatus of determining a touch point 800 for carrying out the method described herein. In some embodiments, the apparatus of determining a touch point 800 can include a detection module 801, a determination module 802, an extraction module 803, a first judgment module 804 and a decision module 806.

The detection module 801 is configured to detect a touch signal value of each point on the screen or other touch surfaces. Depending on specific applications, the touch signal value can be an electrical signal such as a capacitance value, a voltage value, a current value or variation of the electrical signal, or can also be an optical signal, a magnetic signal, an acoustic signal and so on or the variation thereof.

The touch signal value can be detected using a corresponding detection device, e.g., an electrical detection device such as a galvanometer, a voltmeter, etc., or a sensor such as a photoelectric sensor, a transducer, etc.

The determination module 802 is configured to process the detected touch signal value of each point and to determine the point whose touch signal value is greater than the report point threshold as a center point. As described above, the present application does not limit the specific value and the source of the threshold.

The extraction module 803 is configured to extract touch signal values of a plurality of points around the center point, as described above, the specific number of the plurality of points can be different based on specific situations, which can be preset or automatically adjusted.

The first judgment module 804 is configured to compare the extracted touch signal values of the plurality of points around the center point with an auxiliary threshold, and to count the number of the points whose touch signal values are greater than the auxiliary threshold.

The decision module 806 is configured to compare the number of the points in the plurality of points around the center point whose touch signal values are greater than the auxiliary threshold with a first preset value, and make decision in response to the comparison result: if the number of the points whose touch signal values are greater than the auxiliary threshold is greater than or equal to the first preset value, the center point will be determined as a touch point; otherwise, the center point will be determined as a non-touch point, i.e., it is considered to be a ghost point caused by noise.

In some other embodiments, the apparatus of determining a touch point 800 can further comprise a second judgment module 805 configured to compare the extracted touch signal values of a plurality of points around the center point with an abnormal threshold, and to count the number of the points whose touch signal values are greater than the abnormal threshold. Moreover, in these embodiments, the decision module 806 is further configured to compare the number of the points in the plurality of points around the center point whose touch signal values are greater than the abnormal threshold with a second preset value, and to make decision in response to the comparison result: if the number of the points whose touch signal values are greater than the abnormal threshold is greater than or equal to the second preset value, the center point will be determined as a non-touch point; otherwise, the judgment of the first judgment module 804 will be performed.

Although particular functions have been discussed above with reference to particular modules, it shall be noted that the function of each module discussed herein can be divided into a plurality of modules, and/or at least some functions of a plurality of modules can be combined into a single module. Therefore, the reference to particular function modules is only regarded as reference to appropriate modules for providing the described functionality, rather than indicating strict logical or physical structure or organization. Hence, this disclosure can be implemented in a single module, or can be distributed in different modules and circuits physically and functionally. In addition, the particular module that performs actions discussed herein includes performing the actions by the particular module itself, or alternatively calling or accessing another component or module that performs the action in other ways by this particular module (or performing the action together with the particular module). Therefore, the particular module that performs the action can include the particle module itself that performs the action and/or another module called or accessed in other ways by the particular module that performs the action.

More generally, various technologies can be described herein in general context of software, hardware, element or program modules. The modules described above with respect to FIG. 8 can be implemented in hardware, software or hardware combined with software and/or firmware. For example, these modules can be implemented as computer program codes/instructions, which computer program codes/instructions are configured to be performed in one or more processors (central processing unit (CPU), microcontroller, microprocessor etc.) and stored in a computer readable storage medium. Alternatively, these modules can be implemented as hardware logic/circuit, e.g., digital signal processor (DSP), application specific integrated circuit, field programmable gate array (FPGA) etc. The features of the technologies described herein are independent of platform, which means that in applicable cases, these technologies can be implemented on various computing platforms with various processors. This will be further described hereinafter.

Figure 9:
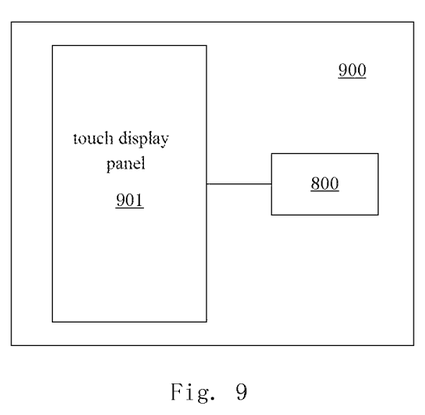
FIG. 9 is a schematic block diagram of a touch display device comprising the apparatus of determining a touch point according to an embodiment of the present application.

FIG. 9 shows a schematic block diagram of a touch display device according to an embodiment of the present application, which comprises the apparatus of determining a touch point 800 described above, and further comprises a touch display panel 901.

The touch display panel 901 can be a screen of a device such as a smart phone, a tablet computer, a laptop computer, a desktop computer, a smart watch etc., a wall mounted touch panel or a device surface of other devices that can be operated by finger touch. The apparatus of determining a touch point 800 can detect a touch signal value of each point on the touch display panel 901, and determine, when the touch signal value of a certain point is greater than a threshold, whether the point is a touch point.

Figure 10:
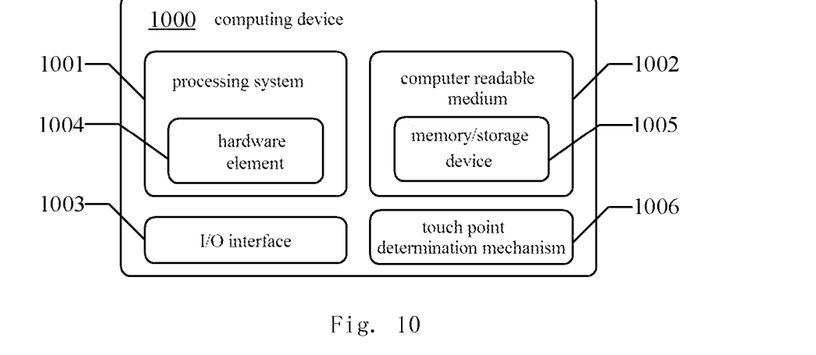
FIG. 10 is a schematic block diagram of a computing device for determining a touch point according to an embodiment of the present application.

FIG. 10 generally illustrates an example computing device 100 that can implement various technologies described herein.

The computing device 1000 can be devices of various types, e.g., a server of the service provider, a device associated with a client (e.g., a client device), a System on Chip and/or any other appropriate computing device or computing system. Examples of the computing device 1000 includes but not limited to: a desktop computer, a server computer, a laptop or netbook computer, a mobile device (e.g., a tablet computer, a cellular or other wireless telephone (e.g., a smart phone), a mobile station), a wearable device (e.g., glasses, watch), an entertainment device (e.g., an entertainment equipment, a set top box communicatively coupled to a display device, a game player), a television, an automotive computer or other display devices and the like.

The example computing device as shown in FIG. 10 comprises a processing system 1001, one or more computer readable mediums 1002 and one or more I/O interfaces 1003 that communicatively couple with each other. Although not shown, the computing device 1000 may further comprise a system bus or other data and command transfer system which couples various components with each other. The system bus can comprises any one or combination of different bus structures, such as a memory bus or a memory controller, a peripheral bus, a universal serial bus and/or a processor or local bus using any one of various bus architectures. Various other examples such as control and data lines are further conceived.

The processing system 1001 represents the function of performing one or more operations using the hardware. Hence, the processing system 1001 is illustrated as comprising a hardware element 1004 that can be configured as a processor, a function block etc. This can include an application specific integrated circuit implemented in the hardware or other logic devices formed by using one or more semiconductors. The hardware element 1004 is not limited by the forming material thereof or the processing mechanism used therein. For example, the processor can consist of (a plurality of) semiconductors and/or transistors (e.g., electronic integrated circuit (IC)). In such a context, the processor executable instruction can be an electronic executable instruction.

The computer readable medium 1002 is illustrated as comprising a memory/storage device 1005. The memory/storage device 1005 represents memory/storage capacity associated with one or more computer readable mediums. The memory/storage device 1005 can include a volatile medium (such as a random access memory (RAM)) and/or a nonvolatile medium (such as a read-only memory (ROM), a flash memory, an optical disk, a magnetic disk etc.). The memory/storage device 1005 can include a fixed medium (e.g., RAM, ROM, a fixed hard disk driver etc.) and a mobile medium (e.g., a flash memory, a mobile hard disk driver, an optical disk etc.). The computer readable medium 1005 can be configured in various other ways to be further described below).

One or more input/output interfaces 1003 represent the functions of allowing the user to type commands and information to the computing device 1000 and also allowing the use of various input/output devices to present information to the user and/or other components or devices. Examples of the input device includes a keyboard, a cursor control device (e.g. mouse), a microphone (e.g., for speech input), a scanner, a touch function (e.g., capacitive or other sensors configured to detect physical touch), a camera (e.g., detecting motions involving no touch as gestures using visible or invisible wavelength (such as infrared frequency)) and the like. Examples of the output device include a display device (e.g., a monitor or a projector), a loudspeaker, a printer, a network card, a tactile response device etc. Hence, the computing device 1000 can be configured in various ways so as to support user interaction.

The computing device 1000 further includes a touch point determination mechanism 1006. The touch point determination mechanism 1006 can be stored in the memory/storage device 1005 as computer program instructions. The touch point determination mechanism 1006 can perform the steps of the touch point determination method 600 or 700 described with respect to FIG. 6 and FIG. 7 along with the processing system 1001 and the I/O interface 1003 as well as necessary detection devices, and implement entire functions of the modules of the apparatus of determining a touch point 800 described with respect to FIG. 8.

Various technologies can be described herein in general context of software, hardware, element or grogram modules. Generally, these modules include routines, programs, objects, elements, components, data structures and so on that perform particular tasks or implement particular abstract data types. The terms "module", "function" and "component" used herein generally represent software, firmware, hardware or combinations thereof.

The implementations of the modules and technologies described can be stored on a certain form of a computer readable medium or transferred across a certain form of a computer readable medium. The computer readable medium can include various mediums that can be accessed by the computing device 1000. As an example rather than limitation, the computer readable medium can include "computer readable storage medium" and "computer readable signal medium".

Contrary to the simple signal transmission, carrier wave or signal itself, the "computer readable storage medium" refers to a medium and/or a device that can store information persistently, and/or a tangible storage device. Hence, the computer readable storage medium refers to a non-signal carrier medium. The computer readable storage medium includes hardware such as volatile or nonvolatile, movable and unmovable mediums and/or storage devices implemented by methods or technologies applicable for storing information (such as computer readable instructions, data structures, program modules, logic elements/circuits or other data). Examples of the computer readable storage medium can include but not limited to RAM, ROM, EEPROM, flash memory or other memory technologies, CD-ROM, digital versatile disc (DVD) or other optical storage devices, hard disc, cassette tape, magnetic tape, magnetic disc storage device or other magnetic storage devices, or other storage devices, tangible medium or products suitable for storing desired information and accessible by the computer.

The "computer readable signal medium" refers to a signal carrier medium configured to transmit instructions to the hardware of the computing device 1000 such as via the network. The signal medium typically can embody the computer readable instructions, data structures, program modules or other data in modulation data signals such as carrier waves, data signals or other transmission mechanisms. The signal medium further includes any information transfer mediums. The term "modulation data signal" refers to a signal for encoding information in the signal in such a way so as to set or change one or more of the characteristics thereof. As examples rather than limitation, a communication medium includes a wired medium such as a wired network or direct connection and a wireless medium such as sound, RF, infrared and other wireless mediums.

As described above, the hardware element 1004 and the computer readable medium 1002 represent instructions, modules, programmable device logic and/or fixed device logic implemented in the form of hardware, which can be used in some embodiments for implementing at least some aspects of the technology described herein. The hardware element can include an integrated circuit or a System on Chip, an Application Specific Integrated Circuit (ASIC), a Field Programmable Gate Array (FPGA), a Complex Programmable Logic Device (CPLD) and component of other implementations or other hardware devices in silicon. In such a context, the hardware element can serve as a processing device for performing program tasks defined by instructions, modules and/or logic embodied by the hardware element, and a hardware device for storing instructions to be executed, for example, the computer readable storage medium described previously.

The preceding combinations can also be used for implementing various technologies and modules described herein. Hence, the software, hardware or program module and other program modules can be implemented as one or more instructions and/or logics on a computer readable storage medium in a certain form and/or embodied by one or more hardware elements 1004. The computing device 1000 can be configured to implement particular instructions and/or functions corresponding to the software and/or hardware modules. Hence, for example, by using the computer readable storage medium 1002 and/or the hardware element 1004 of the processing system, it can be at least partly implemented in hardware that the module is implemented as a module that can be executed by the computing device 1000 as software. The instructions and/or functions can be performed/or operated by one or more products (e.g., one or more computing devices 1000 and/or processing systems 1001) so as to implement the technologies, modules and examples described herein.

It would be appreciated that although the terms such as first, second, third can be used herein for describing various devices, elements, or components, these devices, elements, or components should not be limited by these terms. These terms are only used for distinguishing one device, element, or component from another device, element, or component.

Although this disclosure has been described in combination with some embodiments, it is not intended to be limited to the particular forms elaborated herein. On the contrary, the scope of this disclosure is only limited by the claims attached. Additionally, although individual features can be comprised in different claims, these may possibly be advantageously combined, and the combinations of the non-suggestive features comprised in different claims are not feasible and/or advantageous. The sequence of the non-suggestive features in the claims must be in any particular sequence in which they work. In addition, in the claims, the word "comprise" does not exclude other elements, moreover, the indefinite article "a" or "one" does not exclude "multiple". The reference signs in the claims are only provided as explicit examples and should not be interpreted as limitation to the scopes of the claims in any way.

The invention claimed is:

1. A method of determining a touch point, comprising:
    detecting a touch signal value of each point;
    determining a first point whose touch signal value is greater than a report point threshold as a center point;
    extracting touch signal values of a plurality of second points around the center point;
    comparing the extracted touch signal values of the plurality of second points with an auxiliary threshold, and counting a number of the second points whose touch signal values are greater than the auxiliary threshold;
    determining the first point as a touch point when the number of the second points whose touch signal values are greater than the auxiliary threshold is greater than or equal to a first preset value; and
    before comparing the extracted touch signal values of the plurality of second points with an auxiliary threshold, the method further comprising:
    comparing the extracted touch signal values of the plurality of second points with an abnormal threshold, and counting a number of the second points whose touch signal values are greater than the abnormal threshold; and
    determining the first point as a non-touch point when the number of the second points whose touch signal values are greater than the abnormal threshold is greater than or equal to a second preset value.

2. The method of determining a touch point according to claim 1, wherein the report point threshold is greater than the auxiliary threshold.

3. The method of determining a touch point according to claim 2, wherein the report point threshold is twice as large as the auxiliary threshold.

4. The method of determining a touch point according to claim 1, wherein the first preset value is greater than or equal to the second preset value.

5. The method of determining a touch point according to claim 4, wherein the first preset value is 4.

6. The method of determining a touch point according to claim 1, wherein the abnormal threshold is equal to the report point threshold.

7. The method of determining a touch point according to claim 1, further comprising:
    determining the first point as a non-touch point when the number of the second points whose touch signal values are greater than the auxiliary threshold is less than the first preset value.

8. An apparatus of determining a touch point, comprising:
    a detection module configured to detect a touch signal value of each point;
    a determination module configured to determine a first point whose touch signal value is greater than a report point threshold as a center point;
    an extraction module configured to extract touch signal values of a plurality of second points around the center point;
    a first judgment module configured to compare the touch signal values of the plurality of second points with an auxiliary threshold, and to count a number of the second points whose touch signal values are greater than the auxiliary threshold;
    a second judgment module configured to compare the touch signal values of the plurality of second points with an abnormal threshold, and to count a number of the second points whose touch signal values are greater than the abnormal threshold; and
    a decision module configured to determine the first point as a touch point in response to the number of the second points whose touch signal values are greater than the auxiliary threshold being greater than or equal to a first preset value,
    wherein the decision module is further configured to determine the first point as a non-touch point in response to the number of the second points whose touch signal values are greater than the abnormal threshold being greater than or equal to a second preset value.

9. The apparatus of determining a touch point according to claim 8, wherein the report point threshold is greater than the auxiliary threshold.

10. The apparatus of determining a touch point according to claim 8, wherein the first preset value is greater than or equal to the second preset value.

11. The apparatus of determining a touch point according to claim 8, wherein the abnormal threshold is equal to the report point threshold.

12. The apparatus of determining a touch point according to claim 8, wherein the decision module is further configured to determine the first point as a non-touch point in response to the number of the second points whose touch signal values are greater than the auxiliary threshold being less than the first preset value.

13. A touch display device, comprising:
    a touch display panel; and
    an apparatus of determining a touch point according to claim 8, the apparatus of determining a touch point being connected with the touch display panel, and being configured to determine whether a touch point exists on the touch display panel and a position of the touch point.

14. A computer readable storage medium on which computer instructions are stored, wherein the method of determining a touch point according to claim 1 is carried out when the computer instructions are executed by a processor.

15. The touch display device according to claim 13, wherein the decision module is further configured to determine the first point as a non-touch point in response to the number of the second points whose touch signal values are greater than the auxiliary threshold being less than the first preset value.

\* \* \* \* \*

UNITED STATES PATENT AND TRADEMARK OFFICE
CERTIFICATE OF CORRECTION

| | | |
|---|---|---|
| PATENT NO. | : 11,353,978 B2 | Page 1 of 1 |
| APPLICATION NO. | : 17/279510 | |
| DATED | : June 7, 2022 | |
| INVENTOR(S) | : Wang et al. | |

It is certified that error appears in the above-identified patent and that said Letters Patent is hereby corrected as shown below:

On the Title Page (73) Assignees: Please correct "HEFEI BOE OPTOELECTRONICS TECHNOLOGY CO, LTD.," to read --HEFEI BOE OPTOELECTRONICS TECHNOLOGY CO., LTD.,--

Signed and Sealed this
Fourth Day of October, 2022

Katherine Kelly Vidal
*Director of the United States Patent and Trademark Office*